United States Patent
Foerch et al.

(10) Patent No.: US 11,618,423 B2
(45) Date of Patent: Apr. 4, 2023

(54) MASTER BRAKE CYLINDER FOR A BRAKE SYSTEM OF A VEHICLE, BRAKE DEVICE AND BRAKE SYSTEM HAVING SUCH A MASTER BRAKE CYLINDER, AND METHOD FOR PRODUCING A MASTER BRAKE CYLINDER

(71) Applicant: Robert Bosch GmbH, Stuttgart (DE)

(72) Inventors: Dirk Foerch, Neuenstadt/Stein (DE); Matthias Kistner, Bretzfeld (DE); Otmar Bussmann, Abstatt (DE); Simon Hansmann, Plymouth, MI (US); Urs Bauer, Sachsenheim (DE)

(73) Assignee: Robert Bosch GmbH, Stuttgart (DE)

( * ) Notice: Subject to any disclaimer, the term of this patent is extended or adjusted under 35 U.S.C. 154(b) by 208 days.

(21) Appl. No.: 16/954,025

(22) PCT Filed: Oct. 11, 2018

(86) PCT No.: PCT/EP2018/077690
§ 371 (c)(1),
(2) Date: Jun. 15, 2020

(87) PCT Pub. No.: WO2019/120669
PCT Pub. Date: Jun. 27, 2019

(65) Prior Publication Data
US 2021/0078552 A1    Mar. 18, 2021

(30) Foreign Application Priority Data
Dec. 21, 2017 (DE) .................. 10 2017 223 584.5

(51) Int. Cl.
*B60T 11/20* (2006.01)
*B60T 7/04* (2006.01)
*B60T 8/40* (2006.01)

(52) U.S. Cl.
CPC .............. *B60T 11/20* (2013.01); *B60T 7/042* (2013.01); *B60T 8/4081* (2013.01)

(58) Field of Classification Search
CPC ........ B60T 11/20; B60T 7/042; B60T 8/4081; B60T 8/38; B60Y 2400/81
See application file for complete search history.

(56) References Cited

U.S. PATENT DOCUMENTS 5,146,751 A * 9/1992 Savidan .................. B60T 11/20
60/592
5,452,779 A * 9/1995 Gee ......................... B60T 11/20
192/12 C (Continued)

FOREIGN PATENT DOCUMENTS

CN     103318162 A   9/2013
CN     203766754 U   8/2014

(Continued)

OTHER PUBLICATIONS

International Search Report for PCT/EP2018/077690, dated Dec. 19, 2018.

*Primary Examiner* — Dustin T Nguyen
(74) *Attorney, Agent, or Firm* — Norton Rose Fulbright US LLP; Gerard Messina

(57) ABSTRACT

A master brake cylinder for a brake system of a vehicle having a master brake cylinder housing, a primary piston component, a secondary piston component, a primary spring device which is preloaded with a first preload force between the primary piston component and the secondary piston component, and a secondary spring device, which is preloaded with a second preload force between the secondary piston component and a wall component (of the master brake cylinder housing, with the second preload force of the secondary spring device being greater than the first preload force of the primary spring device. A brake device for a (Continued)

vehicle, a brake system for a vehicle, and a production method for a mater brake cylinder for a brake system of a vehicle are also described.

7 Claims, 5 Drawing Sheets

(56) References Cited

U.S. PATENT DOCUMENTS

| | | | | | |
|---|---|---|---|---|---|
| 5,561,980 | A | * | 10/1996 | Nagasawa | B60T 11/20 92/13.3 |
| 5,617,725 | A | * | 4/1997 | Yasuda | B60T 11/16 92/255 |
| 6,058,705 | A | * | 5/2000 | Schunck | B60T 8/4086 60/592 |
| 7,159,696 | B2 | * | 1/2007 | Kusano | B60T 11/16 188/152 |
| 8,261,546 | B1 | * | 9/2012 | Paige | B60T 11/232 60/562 |
| 2004/0123593 | A1 | | 7/2004 | Nakashima et al. | |
| 2004/0124698 | A1 | | 7/2004 | Nakashima et al. | |
| 2020/0298807 | A1 | * | 9/2020 | Ganzel | B60T 13/62 |

FOREIGN PATENT DOCUMENTS

| | | |
|---|---|---|
| CN | 204605776 U | 9/2015 |
| DE | 19651153 A1 | 6/1998 |
| DE | 19810855 A1 | 9/1999 |
| DE | 10360984 A1 | 7/2004 |
| DE | 10361034 A1 | 7/2004 |
| DE | 102014217427 A1 | 3/2016 |

\* cited by examiner

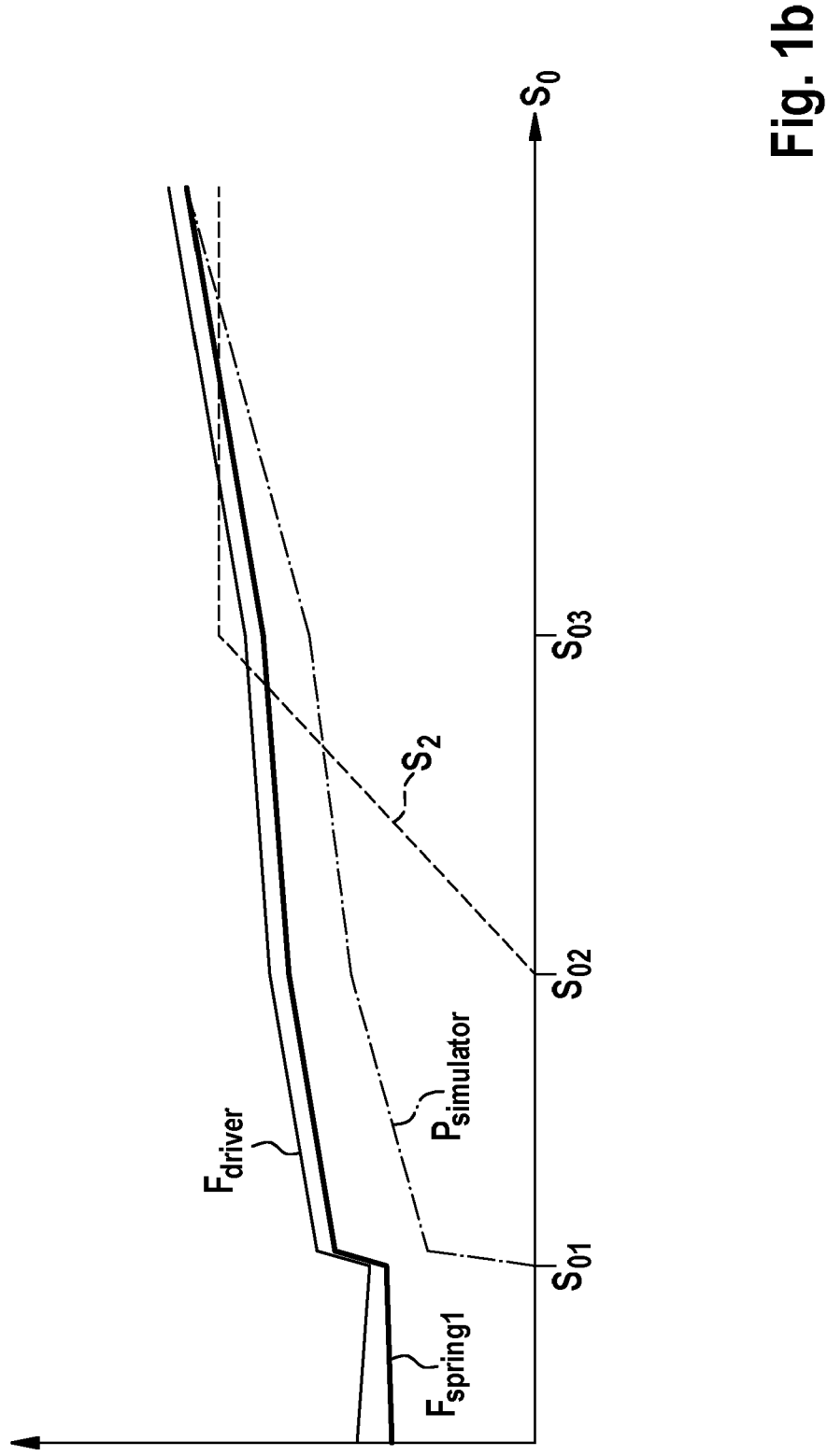

MASTER BRAKE CYLINDER FOR A BRAKE SYSTEM OF A VEHICLE, BRAKE DEVICE AND BRAKE SYSTEM HAVING SUCH A MASTER BRAKE CYLINDER, AND METHOD FOR PRODUCING A MASTER BRAKE CYLINDER

FIELD

The present invention relates to a master brake cylinder for a brake system of a vehicle. In the same way, the present invention relates to a brake device for a vehicle and to a brake system for a vehicle. Moreover, the present invention relates to a production method for a master brake cylinder for a brake system of a vehicle.

BACKGROUND INFORMATION

German Patent Application No. DE 10 2014 217427 A1 describes a brake system for a vehicle and a method for operating the brake system. The brake system has a master brake cylinder including a master brake cylinder housing, a primary piston component and a secondary piston component. A primary spring device is preloaded with a first preload force between the primary piston component and the secondary piston component. In addition, a secondary spring device is preloaded with a second preload force between the secondary piston component and a wall of the master brake cylinder housing.

SUMMARY

The present invention provides a master brake cylinder for a brake system of a vehicle, a brake device for a vehicle, a brake system for a vehicle, and a production method for a master brake cylinder for a brake system of a vehicle.

Example embodiments of the present invention offer a driver the possibility of comfortably braking into a master brake cylinder of his vehicle. As is described in greater detail below, a larger specification of the second preload force of the secondary spring device in comparison with the first preload force of the primary spring device has the result that the primary spring device is compressed first during a transmission of the driver brake force to at least the primary piston component of the master brake cylinder, whereas the secondary spring device still remains in its initial form. (In conventional master brake cylinders, it is usually the secondary spring device which is compressed first during the transmission of the driver brake force to the pistons of the conventional master brake cylinder.) Instead of a "simultaneous closing of compensating bores" of a conventional master brake cylinder, the present invention triggers a "serial closing" of the compensating bores (or a "closing of the compensating bores one after the other"). In contrast to the related art, the present invention therefore induces a smoothing of a conventionally occurring force stage (within the jump in range). The present invention thus allows for more comfortable braking into its respective master brake cylinder for drivers. The present invention is advantageous in particular when the brake system equipped with the master brake cylinder generates a pedal travel/pedal force characteristic that the driver is able to notice on account of the linkage of a pedal feel simulator.

In one advantageous specific embodiment of the master brake cylinder in accordance with the present invention, the second preload force of the secondary spring device is greater by at least 10 Newton than the first preload force of the primary spring device. For example, the second preload force of the secondary spring device may be greater by at least 20 Newton than the first preload force of the primary spring device. Using such a ratio between the first preload force of the primary spring device and the second preload force of the secondary spring device reliably ensures that braking into the master brake cylinder first induces a compression of the primary spring device while the secondary spring device remains in its initial form.

In one cost-effective specific embodiment, the primary spring device and/or the secondary spring device may include at least one captive spring. Alternatively or additionally, the primary spring device and/or the secondary spring device may also include at least one non-captive spring. As a result, a multitude of spring types is able to be used for the primary spring device or the secondary spring device.

As an advantageous further development of the present invention, a primary piston contact area is able to be developed on the housing of the master brake cylinder in such a way that a maximum distance between the primary piston component and the wall component of the master brake cylinder housing contacted by the secondary spring device is predefined in that the primary piston component, which is situated at the maximum distance from the wall component contacted by the secondary spring device, contacts the primary piston contact area. Even if a non-captive spring is used for the primary spring device and the secondary spring device, there is thus no risk of the primary piston component "falling out of" or "slipping out of" the master brake cylinder.

In accordance with the present invention, a brake device for a vehicle having a corresponding master brake cylinder and at least one simulator also provides the afore-described advantages, with the at least one simulator being coupled with a primary chamber of the master brake cylinder restricted by the primary piston component and the secondary piston component, and/or with a secondary chamber of the master brake cylinder restricted by the secondary piston component.

Also advantageous in accordance with the present invention is a brake system for a vehicle having the corresponding master brake cylinder, a primary brake circuit having at least one first wheel brake cylinder, which is coupled with a primary chamber of the master brake cylinder restricted by the primary piston component and the secondary piston component, and a secondary brake circuit having at least one second wheel brake cylinder, which is coupled with a secondary chamber of the master brake cylinder restricted by the secondary piston component.

In one advantageous specific embodiment of the brake system according to the present invention, at least one simulator is additionally coupled with the primary brake circuit and/or with the secondary brake circuit. A pleasant, normal brake actuation feel/pedal feel for the driver is able to be induced with the aid of the at least one simulator/pedal travel simulator even after the wheel brake cylinders have been decoupled from the master brake cylinder.

In addition, the execution of a production method for a master brake cylinder for a brake system of a vehicle in accordance with the present invention also produces the afore-described advantages. It is expressly pointed out that the production method is able to be further developed according to the above-described specific embodiments of the master brake cylinder.

BRIEF DESCRIPTION OF THE DRAWINGS

Additional features and advantages of the present invention are described below on the basis of the figures.

FIGS. 1a and 1b show a schematic illustration of a first specific embodiment of a brake system equipped with a master brake cylinder according to the present invention, and a coordinate system to describe the method of functioning of the master cylinder.

DETAILED DESCRIPTION OF EXAMPLE EMBODIMENTS

Figure 1A:
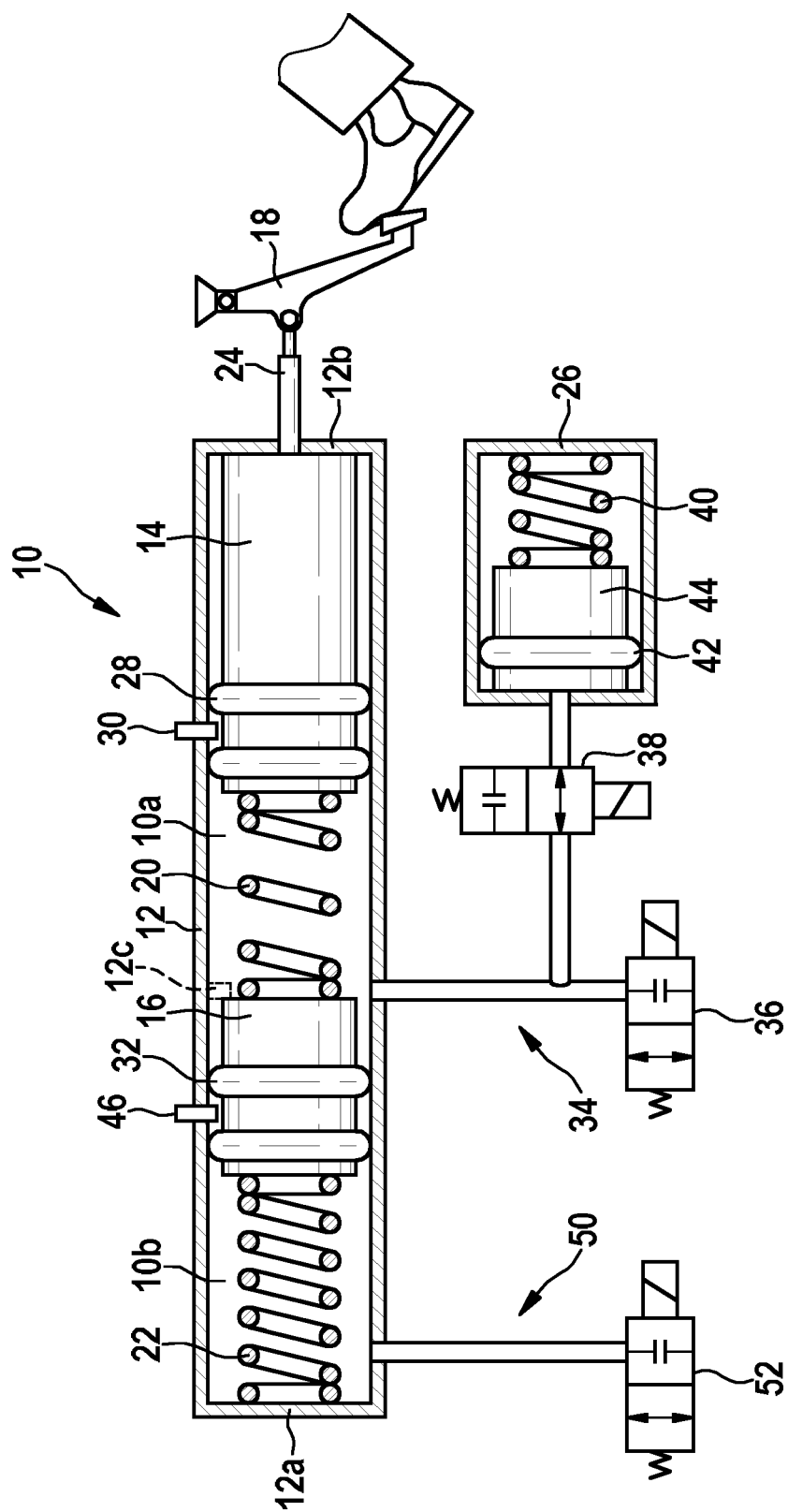

FIGS. 1a and 1b show a schematic illustration of a first specific embodiment of a brake system equipped with the master brake cylinder according to the present invention, and a coordinate system to describe the method of functioning of the master brake cylinder.

Master brake cylinder 10 schematically shown in FIG. 1a is configured for use in a brake system of a vehicle or motor vehicle. It is expressly pointed out that a usability of master brake cylinder 10 is not restricted to a particular type of brake system or to a particular type of vehicle or motor vehicle. The embodiment of the brake system partially reproduced in FIG. 1a is only of an exemplary nature.

Master brake cylinder 10 includes a master brake cylinder housing 12, a primary piston component/rod piston component 14 and a secondary piston component/floating piston component 16. Primary piston component 14 may be considered a piston component which is situated or connected upstream from secondary piston component 16. In the same way, secondary piston component 16 may be described in relation to a brake actuation element 18 such as a brake pedal 18 that is coupled or able to be coupled with master brake cylinder 10 such that secondary piston component 16 is situated on a side of primary piston component 14 that is pointing away from the coupling position of brake actuation element 18 or from coupled brake actuation element 18. Primary piston component 14 may be a rod piston 14, in particular. Accordingly, secondary piston component 16 may be a floating piston 16. However, the possibility of developing primary piston component/floating piston component 14 and secondary piston component/floating piston component 16 is not restricted to a particular piston form or a special piston type.

Master brake cylinder 10 also has a primary spring device 20, which is preloaded with a first preload force/preloading between primary piston component 14 and secondary piston component 16, and a secondary spring device 22, which is preloaded with a second preload force/preloading between secondary piston component 16 and a wall/wall component 12a of master brake cylinder housing 12. The second preload force of secondary spring device 22 is greater than the first preload force of primary spring device 20. One could also describe this as a "reversal of the preload forces" of spring devices 20 and 22 in comparison with a conventional type of master brake cylinder (in which a first spring between its first piston and its second piston is usually more heavily preloaded than a second spring between its second piston and a housing wall). The advantages of the "reversal of the preload forces" in the main brake cylinder of FIG. 1a will be described in greater detail in the following text.

As may be gathered from FIG. 1a, brake actuation element 18 is directly or indirectly coupled with master brake cylinder 10 in such a way that a driver brake force $F_{driver}$ exerted on brake actuation element 18 is able to be transmitted or is transmitted so that at least primary piston component 14 is able to be adjusted or is adjusted by driver brake force $F_{driver}$ exerted thereon. By way of example, brake actuation element 18 is coupled with primary piston component 14 via an input rod 24. If brake actuation element 18 is not actuated, then brake actuation element 18, input rod 24, primary piston component 14 and secondary piston component 16 are situated in their respective initial positions. In addition, brake actuation element 18 is coupled via input rod 24 with primary piston component 14 such that an adjustment travel of primary piston component 14 (from its initial position) corresponds to an input rod travel $s_0$ of input rod 24 (adjusted from its initial position).

By way of example, a simulator/pedal travel simulator 26 is also coupled with a primary chamber 10a of master brake cylinder 10 (with primary spring device 20 situated therein), restricted by primary piston component 14 and secondary piston component 16. On the other hand, a secondary chamber 10b restricted by secondary piston component 16 (and wall 12a) of master brake cylinder 10 (with secondary spring device 22 disposed therein) is "simulator-free".

In the coordinate system of FIG. 1b, an abscissa shows input rod travel $s_0$ of input rod 24 (adjusted from its initial position). The graphs of the coordinate system of FIG. 1b represent driver brake force $F_{driver}$ to be exerted on brake actuation element 18 toward this end; a primary spring force $F_{spring1}$ of primary spring component 20 counteracting the adjustment of brake actuation element 18; an adjustment travel $s_2$ of secondary piston component 16 (from its initial position); and a simulator pressure $p_{simulator}$ simulator present in simulator 26.

When input rod 24 and primary piston component 14 are pushed out of their initial positions, the greater second preload force (in comparison with the first preload force of primary spring device 20) of secondary spring device 22 causes a compression of primary spring component 20 while secondary piston component 16 simultaneously "stays put" in its initial position (and without compression of secondary spring device 22). Because of the "reversal of the preload forces" in the master brake cylinder of FIG. 1a, only the first preload force/preloading of primary spring component 20 and an adhesive friction of at least one seal 28 of primary piston component 14 have to be overcome in order to push input rod 24 and primary piston component 14 out of their initial positions. In contrast, second preload force/preloading of secondary spring device 22 and an adhesive friction of a seal 32 of secondary piston component 16 have no or barely any effect on driver brake force $F_{driver}$ to be generated in order to push input rod 24 and primary piston component 14 out of their initial positions. As a result, driver brake force $F_{driver}$ to be applied at an input rod travel $s_0=0$ is relatively low.

Next, primary piston component 14 pushed out of its initial position (together with input rod 24) is able to be shifted under compression of primary spring component 20 until a first compensating bore 30, which is developed adjacently to primary piston component 14 on master brake cylinder housing 12, is sealed/closed with the aid of primary piston component 14. Because of the greater second preload force of secondary spring device 22 (in relation to first preload force of primary spring device 20), secondary piston component 16 stays in its initial position (without a compression of secondary spring device 22). The second preload force of secondary spring device 22 and the adhesive friction of seal 32 of secondary piston component 16 thus have no effect on a driver brake force $F_{driver}$ to be applied until first compensating bore 30 is closed. The closing of first compensating bore 30 is therefore possible at a relatively low driver brake force $F_{driver}$.

As soon as first compensating bore 30 is closed, a further increase in input rod travel $s_0$ (due to secondary piston component 16 continuing to stay in its initial position) causes the brake fluid in primary chamber 10a of master brake cylinder 10 to be compressed. If a primary brake circuit 34 is coupled with at least one first wheel brake cylinder (not shown) and/or simulator 26 with primary chamber 10a, then brake fluid is also able to be displaced into primary brake circuit 34 and/or simulator 26.

The brake system of FIG. 1a is embodied as a by wire brake system by way of example. For this purpose, primary brake circuit 34 includes an isolation valve 36 by which the at least one first wheel brake cylinder is able to be coupled with or decoupled from primary chamber 10a, and a simulator isolation valve 38, via which simulator 26 is able to be coupled with primary chamber 10a or be decoupled therefrom. By closing isolation valve 36, the at least one first wheel brake cylinder of primary brake circuit 34 is able to be decoupled from primary chamber 10a in order to prevent a braking effect of the at least one first wheel brake cylinder. (Instead of the at least one first wheel brake cylinder, for example, an electric motor employed as a generator is able to be used for decelerating the vehicle equipped with the brake system.) During the closing of isolation valve 36 or while isolation valve 36 is being kept closed, simulator 26 is able to be coupled or remain coupled with primary chamber 10a by opening simulator isolation valve 38 or keeping it open in such a way that the driver who is actuating actuation element 18 brakes into simulator 26 starting with the overcoming of a preload of a simulator spring 40 and an adhesive friction of a seal 42 of a simulator piston 44 of simulator 26. This is the case starting with an input rod travel $s_0 = s_{01}$, for which reason simulator pressure $p_{simulator}$ present in simulator 26 becomes greater with an increase in input rod travel $s_0 > s_{01}$. (The overcoming of the preloading of simulator spring 40 and the adhesive friction of seal 42 of simulator piston 44 causes only a relatively small increase in driver brake force $F_{driver}$ to be generated by the driver, of which the driver is unaware or barely aware).

Force difference z between the first preload force/preloading of primary spring device 20 and second preload force/preloading of secondary spring device 22 will be overcome only at an input rod travel $s_0 = s_{02}$. For this reason, secondary piston component 16 remains in its initial position up to input rod travel $s_0 = s_{02}$, so that the at least one seal 32 of secondary piston component 16 and the second preload force of secondary spring device 22 have no effect on driver brake force $F_{driver}$ when braking into the simulator at an input rod travel $s_0 < s_{02}$ (but $s_0 > s_{01}$). Starting with input rod travel $s_0 = s_{02}$, secondary piston component 16 is also pushed out of its initial position under compression of secondary spring device 22, with a compression of brake fluid in secondary chamber 10b of master brake cylinder 10 being prevented until a second compensating bore 46 developed adjacently to secondary piston component 16 on master brake cylinder housing 12 is closed. Second compensating bore 46 is covered/closed with the aid of secondary piston component 16 only at an input rod travel $s_0 = s_{03}$. A further increase in input rod travel $s_0 > s_{03}$ may cause a compression of the brake fluid in secondary chamber 10b.

In the example of FIG. 1a, a secondary brake circuit 50 having at least one second wheel brake cylinder (not shown) is coupled with secondary chamber 10b. Simply by way of example, the secondary brake circuit has an isolation valve 52 whose closing allows the at least one second wheel brake cylinder to be decoupled from secondary chamber 10b. If desired, an increase in adjustment travel $s_2$ of secondary piston component 16 that goes beyond the covering of second compensating bore 46 is able to be prevented by closing isolation valve 52. In this case, as illustrated in the coordinate system of FIG. 1b, only input rod 24, simulator piston 44 and primary piston component 14 continue to move with an increase in input rod travel $s_0 > s_{03}$, while adjustment travel $s_{02}$ of secondary piston component 16 remains constant.

As described above, the increase in the second preload force of secondary spring device 22 in comparison with the lower first preload force of primary spring device 20 induces a "serial closing" of compensating bores 30 and 46 (or a "closing of compensating bores 30 and 46 one after the other") in contrast to a "simultaneous closing of compensating bores" of a conventional master brake cylinder. The driver brake force $F_{driver}$ shown in the coordinate system of FIG. 1b thus features a plurality of abrupt changes in force with a steady increase in input rod travel $s_0$, but they are not, or only barely, noticeable. This may also be described as smoothing of a (considerable) force step (within the jump in range) triggered in the related art by the "simultaneous closing of compensating bores" of a conventional master brake cylinder. The increase in the second preload force/preloading of secondary spring device 22 in comparison with the lower first preload force/preloading of primary spring device 20 thus improves a brake actuation feel/pedal feel of the driver who is actuating brake actuation element 18.

Figure 2:
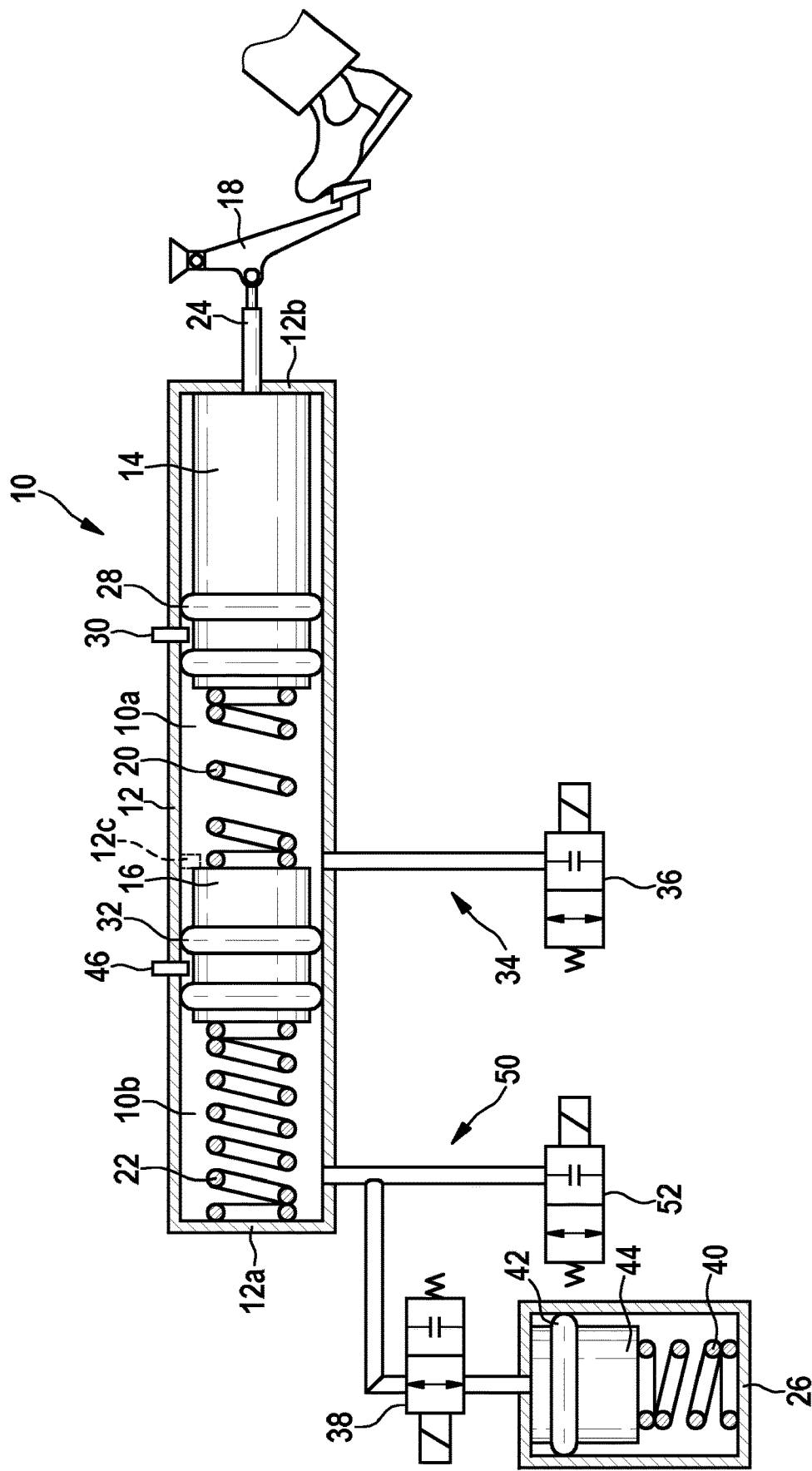
FIG. 2 shows a schematic illustration of a second specific embodiment of a brake system equipped with the master brake cylinder.

FIG. 2 shows a schematic illustration of a second specific embodiment of a brake system equipped with the master brake cylinder.

In contrast to the previously described specific embodiment, simulator 26 in the brake system of FIG. 2 is connected to secondary chamber 10b of master brake cylinder 10. As a result, the preloading of simulator spring 40 and the adhesive friction of seal 42 of simulator piston 44 have to be overcome only at the start of the closing of second compensation bore 46. The increase in driver brake force $F_{driver}$ required to overcome the preloading of simulator spring 40 and the adhesive friction of seal 42 of simulator piston 44 thus occurs only at a greater input rod travel $s_0$.

With regard to further features of the brake system of FIG. 2, reference is made to the previously described specific embodiment. The brake systems of FIGS. 1 and 2 both also offer the advantage that the entire volume expelled from master brake cylinder 10 is displaced into simulator 26 if the respective brake system is present in the by wire mode (with closed isolation valves 36 and 52).

Figure 3:
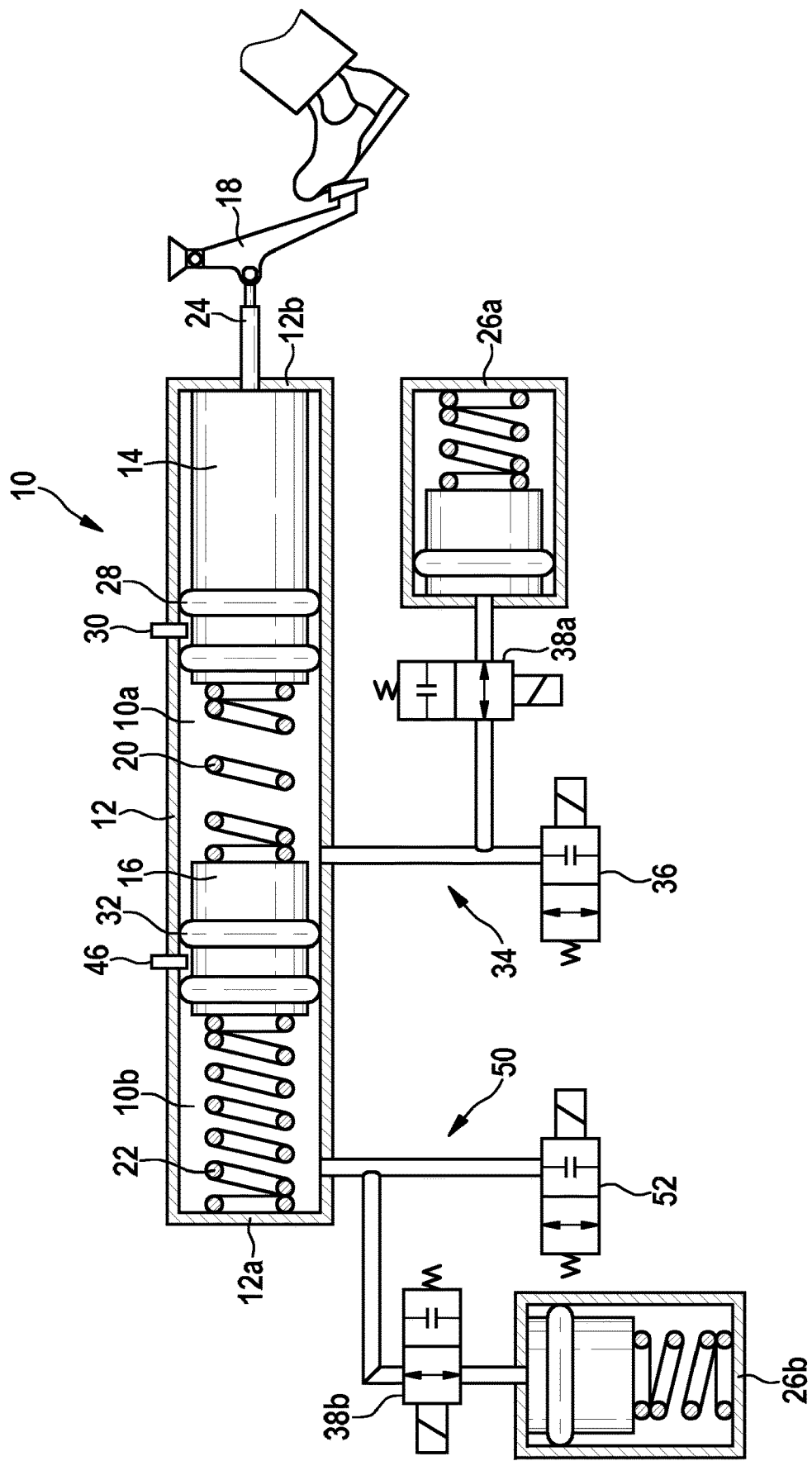
FIG. 3 shows a schematic illustration of a third specific embodiment of a brake system equipped with the master brake cylinder.

FIG. 3 shows a schematic illustration of a third specific embodiment of a brake system equipped with the master brake cylinder.

In the specific embodiment schematically illustrated in FIG. 3, each brake circuit 34 and 50 is equipped with a separate simulator 26a or 26b, a separate isolation valve 36 or 52 and a separate simulator isolation valve 38a or 38b. Switching isolation valves 36 and 52 makes it possible for the brake system of FIG. 3 to optionally adjust either an input rod travel/driver brake force characteristic curve as in the brake system of FIG. 1, or an input rod travel/driver brake force characteristic curve as in the brake system of FIG. 2. For example, this may be used for shortening a jump in range. To ensure a mechanical backup, each simulator 26a and 26b may be configured for the accommodation of only one half of the brake fluid volume which is able to be expelled from master brake cylinder 10.

The afore-described advantages of the previously described embodiments of master brake cylinders 10 are also obtained by a brake device for a vehicle having a respective master brake cylinder 10 and at least one simulator 26, with the at least one simulator 26 optionally being coupled only with primary chamber 10a of master brake cylinder 10, which is restricted by primary piston component 14 and secondary piston component 16; only with secondary chamber 10b of master brake cylinder 10, which is restricted only by secondary piston component 16, or with primary chamber 10a and secondary chamber 10b of master brake cylinder 10.

It is expressly pointed out that all afore-described brake systems or the corresponding brake devices are able to be developed "without any problems" without a brake booster due to the "serial closing" of compensating bores 30 and 46 (that is to say, the "closing of compensating bores 30 and 46 one after the other"). (This may be understood to denote that driver brake force $F_{driver}$ exerted on brake actuation element 18 is transmitted without boosting to at least primary piston component 14 of master brake cylinder 10 in all operating modes of the brake devices/the brake system.) As a result, it is possible to (essentially) dispense with equipping the brake device/the brake system with a brake booster such as a vacuum brake booster. At the same time, as illustrated by the advantageous continuous characteristic curve of driver brake force $F_{driver}$ without noticeable abrupt changes in force of FIG. 1b, a brake actuation feel/pedal feel "like in a vacuum brake booster" is able to be simulated (while a brake pressure buildup requested by driver brake force $F_{driver}$ is able to be induced using some other source).

In all above-described brake systems, the second preload force of secondary spring device 22 may be greater by at least 10 Newton, in particular by at least 20 Newton, and especially by at least 30 Newton than the first preload force of the primary spring device. This ensures the respective desired "serial closing" of compensating bores 30 and 46.

While a conventional master brake cylinder usually has captive restoring springs, primary spring device 20 and/or secondary spring device 22 may include at least one uncaptured spring in master brake cylinder 10 of all afore-described brake systems. In FIGS. 1a, 2 and 3, each spring device 20 and 22 has one non-captive spring. In the same way, however, primary spring device 20 and/or secondary spring device 22 may also have at least one captive spring. In addition, it is also possible to use at least two (non-captive and/or captive) springs per spring device 20 or 22 in master brake cylinder 10. Spring devices 20 and 22 may thus have a wide variety of different designs.

In order to support the use of a non-captive spring for spring devices 20 and 22, a primary piston contact region 12b is also developed on master brake cylinder housing 12 of master brake cylinder 10, in such a way that a maximum distance between primary piston component 14 and wall 12a of master brake cylinder housing 12 (contacted by secondary spring device 22) is predefined in that primary piston component 14, which is situated at the maximum distance from wall 12a, contacts primary piston contact area 12b. As a consequence, there is no risk of primary piston component 14 falling or sliding out of master brake cylinder 10. In the same way, a maximum length of spring devices 20 and 22 is able to be specified with the aid of primary piston contact area 12b. Developing primary piston contact area 12b on master brake cylinder housing 12 also increases the precision in the determination of input rod travel $s_0$. Optionally, it is also possible to develop an end stop 12c for secondary piston component 16 on master brake cylinder housing 12. Thus, secondary piston component 16 is able to be optionally brought into a defined neutral position with the aid of a spring capture or with the aid of end stop 12c.

As a further development, the afore-described brake systems may also be developed with at least one pressure sensor. The at least one pressure sensor may optionally be coupled with a simulator-fitted brake circuit and/or with a brake circuit without a simulator. In all cases, an input rod measurement is able to be checked and/or improved using at least one pressure value/admission pressure value measured with the aid of the at least one pressure sensor. Moreover, in the case of a faulty signal in the input rod measurement, a substitute value for input rod travel $s_0$ is able to be specified taking the at least one measured pressure value/admittance value into account. All afore-described brake systems are able to be operated in a reliable manner in the by wire mode, e.g., using the substitute value for input rod travel $s_0$ specified on the basis of the at least one measured pressure value/admittance pressure value.

Because of their development as by wire brake systems, the afore-described brake systems are well suited for a recuperation or for autonomous braking. However, a use of the master brake cylinder in a by wire brake system is not mandatory.

Figure 4:
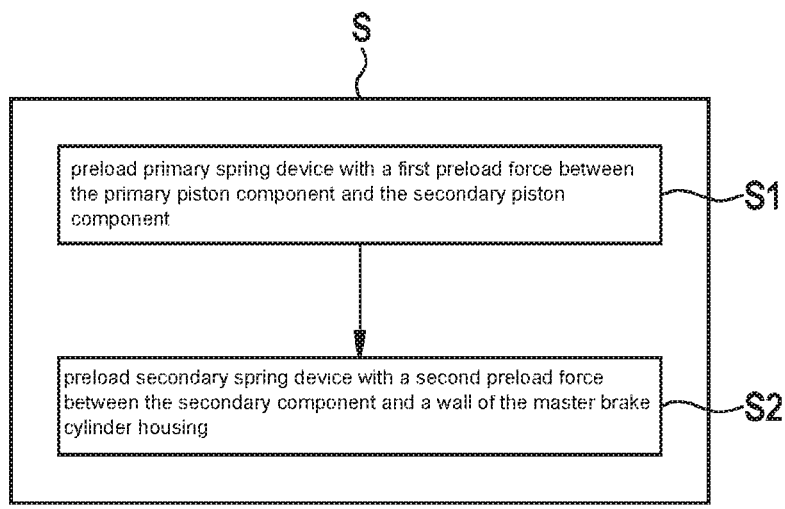
FIG. 4 shows a flow diagram to describe a specific embodiment of a production method for a master brake cylinder for a brake system of a vehicle.

FIG. 4 shows a flow diagram to describe a specific embodiment of a production method for a master brake cylinder for a brake system of a vehicle.

When carrying out the production method, a primary piston component and a secondary piston component are positioned in a master brake cylinder housing of the subsequent master brake cylinder in a method step S. In a sub-step S1, a primary spring device is preloaded with a first preload force between the primary piston component and the secondary piston component for this purpose. In a further sub-step S2, a secondary spring device is preloaded with a second preload force between the secondary piston component and a wall component of the master brake cylinder housing, with the secondary spring device being preloaded with a second preload force which is greater than the first preload force of the primary spring device. The sub-steps S1 and S2 are able to be carried out in any sequence, at the same time or with an overlap in time.

What is claimed is:

1. A master brake cylinder for a brake system of a vehicle, comprising:
    a master brake cylinder housing;
    a primary piston component;
    a secondary piston component;
    a primary spring device, preloaded with a first preload force, between the primary piston component and the secondary piston component; and
    a secondary spring device, preloaded with a second preload force, between the secondary piston component and a wall component of the master brake cylinder housing;
    wherein the second preload force of the secondary spring device is greater than the first preload force of the primary spring device, wherein:
        a primary piston contact area is on the master brake cylinder housing in such a way that a maximum distance between the primary piston component and the wall component of the master brake cylinder housing contacted by the secondary spring device is predefined in that the primary piston component, which is situated at the maximum distance from the wall component contacted by the secondary spring device, contacts the primary piston contact area, the master brake cylinder housing includes a compensating bore located adjacent to the primary piston component, the primary piston component includes a seal that frictionally engages an inner wall of the master brake cylinder housing, the seal being configured to leave the compensating bore open when the primary piston is at rest, and in response to a force that causes the primary piston to move inside the master brake cylinder housing and compress the primary spring without compressing the secondary spring, the seal of the primary piston is configured to move along the inner wall and close the compensating bore.

2. The master brake cylinder as recited in claim 1, wherein the second preload force of the secondary spring device is greater by at least 10 Newton than the first preload force of the primary spring device.

3. The master brake cylinder as recited in claim 2, wherein the second preload force of the secondary spring device is greater by at least 20 Newton than the first preload force of the primary spring device.

4. A brake device for a vehicle, comprising:
a master brake cylinder, including:
a master brake cylinder housing;
a primary piston component;
a secondary piston component;
a primary spring device, preloaded with a first preload force, between the primary piston component and the secondary piston component; and
a secondary spring device, preloaded with a second preload force, between the secondary piston component and a wall component of the master brake cylinder housing;
wherein the second preload force of the secondary spring device is greater than the first preload force of the primary spring device; and
at least one simulator, the at least one simulator being coupled with: (i) a primary chamber of the master brake cylinder, the primary chamber being restricted by the primary piston component and the secondary piston component, and/or (ii) a secondary chamber of the master brake cylinder, the secondary chamber being restricted by the secondary piston component, wherein:
a primary piston contact area is on the master brake cylinder housing in such a way that a maximum distance between the primary piston component and the wall component of the master brake cylinder housing contacted by the secondary spring device is predefined in that the primary piston component, which is situated at the maximum distance from the wall component contacted by the secondary spring device, contacts the primary piston contact area,
the master brake cylinder housing includes a compensating bore located adjacent to the primary piston component,
the primary piston component includes a seal that frictionally engages an inner wall of the master brake cylinder housing, the seal being configured to leave the compensating bore open when the primary piston is at rest, and in response to a force that causes the primary piston to move inside the master brake cylinder housing and compress the primary spring without compressing the secondary spring, the seal of the primary piston is configured to move along the inner wall and close the compensating bore.

5. A brake system for a vehicle, comprising:
a master brake cylinder, including:
a master brake cylinder housing;
a primary piston component;
a secondary piston component;
a primary spring device, preloaded with a first preload force, between the primary piston component and the secondary piston component; and
a secondary spring device, preloaded with a second preload force, between the secondary piston component and a wall component of the master brake cylinder housing;
wherein the second preload force of the secondary spring device is greater than the first preload force of the primary spring device; and
a primary brake circuit having at least one first wheel brake cylinder, the primary brake circuit being coupled with a primary chamber of the master brake cylinder, the primary chamber being restricted by the primary piston component and the secondary piston component; and
a secondary brake circuit having at least one second wheel brake cylinder, the secondary brake circuit being coupled with a secondary chamber of the master brake cylinder, the secondary chamber being restricted by the secondary piston component, wherein:
a primary piston contact area is on the master brake cylinder housing in such a way that a maximum distance between the primary piston component and the wall component of the master brake cylinder housing contacted by the secondary spring device is predefined in that the primary piston component, which is situated at the maximum distance from the wall component contacted by the secondary spring device, contacts the primary piston contact area,
the master brake cylinder housing includes a compensating bore located adjacent to the primary piston component,
the primary piston component includes a seal that frictionally engages an inner wall of the master brake cylinder housing, the seal being configured to leave the compensating bore open when the primary piston is at rest, and
in response to a force that causes the primary piston to move inside the master brake cylinder housing and compress the primary spring without compressing the secondary spring, the seal of the primary piston is configured to move along the inner wall and close the compensating bore.

6. The brake system as recited in claim 5, further comprising:
at least one simulator coupled with the primary brake circuit and/or with the secondary brake circuit.

7. A production method for a master brake cylinder for a brake system of a vehicle, comprising the following steps:
positioning a primary piston component and a secondary piston component in a master brake cylinder housing;
preloading a primary spring device with a first preload force between the primary piston component and the secondary piston component; and preloading a secondary spring device with a second preload force between the secondary piston component and a wall component of the master brake cylinder housing;

wherein the secondary spring device is preloaded with a second preload force which is greater than the first preload force of the primary spring device, wherein:

a primary piston contact area is on the master brake cylinder housing in such a way that a maximum distance between the primary piston component and the wall component of the master brake cylinder housing contacted by the secondary spring device is predefined in that the primary piston component, which is situated at the maximum distance from the wall component contacted by the secondary spring device, contacts the primary piston contact area, the master brake cylinder housing includes a compensating bore located adjacent to the primary piston component, the primary piston component includes a seal that frictionally engages an inner wall of the master brake cylinder housing, the seal being configured to leave the compensating bore open when the primary piston is at rest, and in response to a force that causes the primary piston to move inside the master brake cylinder housing and compress the primary spring without compressing the secondary spring, the seal of the primary piston is configured to move along the inner wall and close the compensating bore.

* * * * *